United States Patent [19]

Hentschel et al.

[11] Patent Number: 4,843,723
[45] Date of Patent: Jul. 4, 1989

[54] RECESS GAUGE FOR A HYDRAULIC LASH ADJUSTER

[75] Inventors: Erwin F. Hentschel, Bay City; John G. Fahrenbruch, Saginaw; David M. Kennedy, Merrill, all of Mich.

[73] Assignee: Eaton Corporation, Cleveland, Ohio

[21] Appl. No.: 155,791

[22] Filed: Feb. 16, 1988

[51] Int. Cl.$^4$ .............................................. G01B 5/12
[52] U.S. Cl. ..................................... 33/178 R; 33/607
[58] Field of Search ............. 33/178 R, 178 E, 178 F, 33/147 K, 607, 611

[56] References Cited

U.S. PATENT DOCUMENTS

| | | | |
|---|---|---|---|
| 1,595,368 | 8/1926 | Volis | 33/178 R |
| 2,047,607 | 7/1936 | Zimmerman | 33/178 R |
| 2,661,540 | 12/1953 | Dulligan | 33/178 R |

Primary Examiner—Harry N. Haroian
Attorney, Agent, or Firm—F. M. Sajovec

[57] ABSTRACT

A gauge for determining the proper formation of an annular recess formed at the bottom of a blind bore in the body of a hydraulic lash adjuster. A shaft having a tapered end is mounted in a block and an expandable, cylindrical gauging member is received over the tapered portion. A cylindrical sleeve is received over the shaft and is biased into engagement with the gauging member by springs acting between the block and the sleeve. When this assembly is inserted into the lash adjuster body and the gauging member contacts the bottom of the bore, continued axial movement of the shaft causes the gauging member to expand into the recess as the tapered portion of the shaft moves through the gauging member. Measurement of the amount of movement of the shaft provides an indication of the radial movement of the gauging element by virtue of the tapered interconnection.

16 Claims, 3 Drawing Sheets

RECESS GAUGE FOR A HYDRAULIC LASH ADJUSTER

This invention relates generally to fluid operated lash adjusters, or tappets for internal combustion engines, and more particularly to a gauge assembly for insuring that certain critical dimensions are maintained in the production of body members of such lash adjusters.

A lash adjuster is a precision mechanical device which acts between an engine camshaft and a poppet valve to control the lash in the valve train. Typically, a lash adjuster comprises a plunger and body assembly with a high pressure oil chamber therein and one-way valve means between the plunger and the chamber, whereby any clearance which tends develop in the system is taken up by oil entering the chamber through the one-way valve to force the plunger and body apart.

It is well known in the art that the proper operation of an hydraulic lash adjuster requires close manufacturing tolerances between mating parts, and particularly so as to the precision sliding fit between the plunger and the body such that these parts must be precision ground and matched in the production process. In the operation of a typical lash adjuster the travel of the plunger within the body is limited by a shoulder formed by the intersection of a blind body bore with a counterbore formed in the bottom of the main blind bore and in which portions of the one-way valve assembly are received. As dictated by good design practice, prior to grinding the bore of the body a grind relief recess is machined in the bore adjacent the bottom thereof at the intersection of the bore with the shoulder such that the bottom corner of the bore is unground but at a diameter greater than the bore diameter. This insures that a rounded or other profile edge is not formed at this intersection, and thus insures that the outside diameter of the plunger will contact only the precision-ground inside diameter of the bore through the full extent of its travel.

The grind relief recess is formed by means of a cutting tool which may have other cutting edges thereon adapted to form other internal features within the bore of the body, e.g. retaining ring grooves, fluid collector recesses and the like, in accordance with modern automatic machining practices. Whether a single point tool or a multiple function tool is used, the cutting edge which forms the grind relief recess is susceptible to breakage.

While normal wear is easily detected through routine inspection methods, and even catastrophic failure is readily detected, such tools are also susceptible to being chipped, a condition which may not be easily detected in high-speed production, particularly if the chipping is relatively minor in terms of the percentage of the cutting edge which is affected. The effect of even such minor chipping can, however, be catastrophic in terms of the effect on the operation of a lash adjuster. If the end of the tool becomes chipped, an irregular corner can be left at the bottom of the blind bore which will not be removed by the grinding wheel. Although all components of the lash adjuster are rigorously inspected at various stages of manufacture, such a corner is difficult to detect using normal production inspection procedures. As a result, it is possible for a significant number of lash adjuster bodies to pass through normal inspection, and subsequent assembly and final inspection steps with an improperly formed grind relief.

The possible consequence of an improperly formed grind relief is a non-functioning lash adjuster which can result in an engine failure. Such non-functioning can occur if sufficient material remains at the intersection of the bore and the shoulder to interfere with the plunger when it bottoms against the shoulder, causing the plunger to become jammed in its bottomed-out position. This can result in there being sufficient clearance or lash between the lash adjuster and the poppet valve to render the valve inoperable.

What the present invention seeks to provide is a method and apparatus for detecting a chipped tool condition in the production of hydraulic lash adjusters, and more specifically a gauging device which is capable of accurately and quickly checking the proper formation of a grind relief recess in the bore of a lash adjuster body member.

To meet this objective, the present invention provides a gauge in the form of an elongated member which is inserted into the body bore, and which has assembled on the end thereof an expandable gauging element which when expanded protrudes into the grind relief recess. If the recess is properly formed the end member will extend into the recess a predetermined minimum distance which can be displayed by means of a mechanical dial indicator or by means of a linear position transducer to indicate an acceptable part. In accordance with the invention the gauge is designed such that the expandable member is automatically extended in response to contact with the shoulder defined at the bottom of the blind bore in the body member. A specific relationship is established between movement of the elongated member axially of the body, and extension of the end member so that the extension into the recess can be conveniently read as a function of the axial movement of the elongated member.

Other objectives and advantages of the invention will be apparent from the following description when considered in connection with the drawings, wherein.

Figures 1, 4:
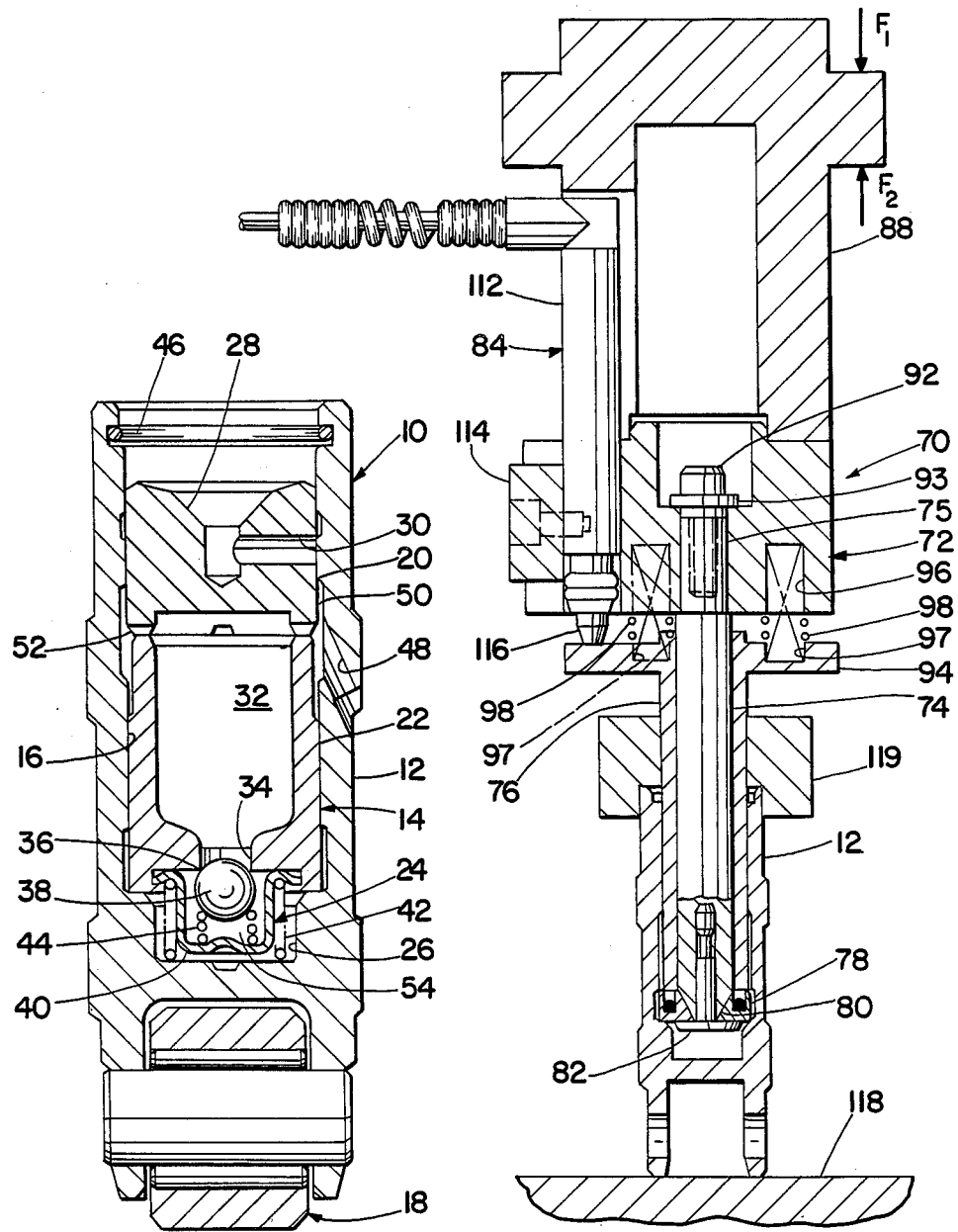
FIG. 1 is a cross-sectional view of a typical hydraulic lash adjuster with which the present invention is intended to be used.
FIG. 4 is a cross-sectional view of the gauge assembly of the present invention.

Referring to FIG. 1, there is illustrated an hydraulic tappet, designated generally by the numeral 10, comprising a body 12, a lash adjusting assembly 14 received within a blind bore 16 formed in the body, and a cam follower assembly 18 received in an opening formed in one end of the body 12. Tappets of this general configuration are well known in the art, and will not be described herein in detail except as necessary to provide a complete understanding of the present invention.

The lash adjusting assembly 14 comprises an upper plunger 20 received in close-fitting relationship within the bore 16, a lower plunger 22 in close-fitting relationship within the bore, and a check valve assembly 24 received between the lower end of the plunger and the end of a counterbore 26 formed in the body 12 coaxial with the bore 16.

The upper end of the upper plunger 20 has a socket 28 formed therein for engagement with a pushrod as is well known in the art. The upper plunger has formed therein an oil metering hole 30 which communicates with the socket 28 to meter oil to the pushrod. The lower plunger 22 has a fluid reservoir 32 formed therein, with a passage 34 formed through the lower end of the plunger and defining a check valve seat 36 where it breaks through the bottom end of the plunger.

The check valve assembly 24 comprises a ball valve 38 engageable with the seat 36, a cage 40 received against the lower surface of the plunger 22, a bias spring 42 acting between the cage and the bottom of counterbore 26 to bias the plungers outwardly of the body 12, and a second spring 44 acting between the ball and an inner surface of the cage to bias the ball into engagement with the valve seat. The plungers are retained within the body 12 by means of a retaining ring 46 received within an annular groove formed adjacent the outer end of the body.

The body 12 has an oil feed hole 48 formed therein which communicates with an annular relieved area 50 formed in the body bore. The bottom end of the upper plunger 20 has a shallow counterbore formed therein, and inlet slots 52 are formed in the annular wall defined between the counterbore and the outside diameter of the plunger to define an oil feed path from the feed hole 48, into the relieved area 50 and through the slots into the reservoir 32.

In accordance with the well-known operation of such lash adjusters, when the poppet valve operated by the lash adjuster is closed the check valve permits oil to flow from reservoir 32 into a high pressure chamber 54 defined between the bottom end of the bottom plunger and the counterbore 26. The combined effects of the pressure in reservoir 32 and the force of spring 42 lift the plungers away from the bottom of the body 12 to take up lash in the engine valve train. When valve opening force is applied to the upper plunger 20, the plungers are forced downward compressing the oil trapped in high pressure chamber 54.

It can be readily appreciated that for proper functioning of the lash adjuster 10, a precision sliding fit must be defined between the plungers and the bore 16 such that these surfaces must be precision ground and carefully matched in production. Referring to FIGS. 2A-3B, a shoulder 56 against which the plunger 22 can bottom out is defined by the intersection of the bottom of bore 16 and the counterbore 26, and in accordance with good engineering and manufacturing practices, a recess 58 is machined into the bore 16 at the bottom thereof prior to grinding. The recess does not serve a direct function in the operation of the lash adjuster; however, it is critical in that without the recess it would be difficult to obtain a well-defined shoulder 56 since the grinding wheel used to finish the bore would necessarily leave a radius at the base of the bore. Such a radius could interfere with the free movement of the plunger. By forming the recess, the grinding wheel need only enter the bore to a depth corresponding to the upper end of the recess, thus maintaining a sharp, clean corner 60 at the bottom of the bore and at a diameter which will not interfere with the plunger.

Figure 2A:
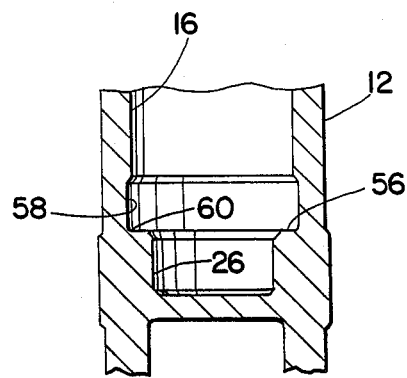
FIG. 2A is a fragmentary cross-sectional view of the body portion of the tappet illustrated in FIG. 1.
Figure 2B:
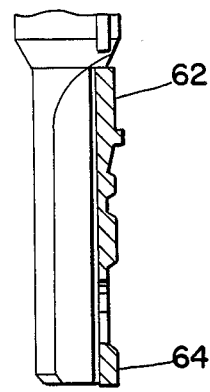
FIG. 2B is a view shown partly in section illustrating a tool for forming a recess in a tappet body, in its normal condition.

In FIG. 2B there is illustrated a tool 62 of the type used to form the various relieved areas and recesses in the bore 16 of the body, including the grind relief recess 58. In accordance with modern manufacturing procedures the tool 62 is typically mounted in a spindle of a multiple station machine tool and is automatically put into position to machine the inside of the bore as part of an automatically controlled machinery line. After the machining step the bore 16 is precision ground.

A problem which can occur in such machining operations is that tools such as the tool 62 are susceptible to breakage particularly at areas such as the end 64 which forms the corner 60 in the recess 58. FIG. 3B illustrates such a break in the tool, while Fig. 3A illustrates the consequence of such a broken tool in that the base of the bore is formed as a ragged edge 66 instead of a clean corner.

Figure 3A:
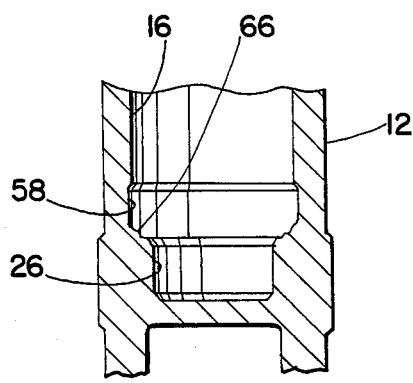
FIG. 3A is a view of a tappet body similar to FIG. 2A, but showing a recess therein which has been formed by a chipped tool.
Figure 3B:
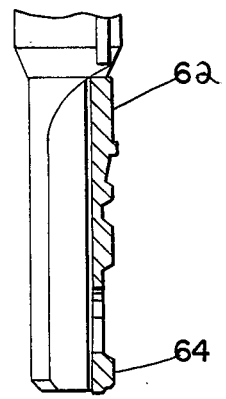
FIG. 3B is a view similar to FIG. 3A, but showing a chipped tool.

Referring again to FIG. 1, it can be appreciated that if the recess is improperly formed as illustrated in FIG. 3A, the ragged surface 66 can interfere with free movement of the plunger 22 within the bore, resulting in malfunctioning of the lash adjuster. In extreme cases the plunger can become jammed into the ragged surface causing total loss of lash adjustment function.

Referring to FIG. 4, there is illustrated a gauge assembly 70, constructed in accordance with the invention, which makes it possible to detect an improperly formed grind relief in production, thus providing early detection of a broken tool condition. The gauge assembly comprises a coupling block 72, an elongated shaft 74 rigidly mounted within the block, an actuating sleeve 76 surrounding the shaft and adapted to fit closely within the bore 16 of body 12, an expandable gauging member 78 received over a tapered end 80 of the shaft, a retaining member 82 which retains the gauge member on the shaft, and an indicator assembly 84 acting between the block 72 and the sleeve 76.

The coupling block 72 comprises a cubiform member which can be bolted to a spacer 88 for installation in automated gauging equipment (not shown) and the like. As will become apparent from the following description, it can be appreciated that operation of the gauge assembly 70 requires only some means to apply a downward force as indicated by arrow $F_1$ to provide limited movement of the gauge assembly in a direction parallel to the axis of shaft 74. Such means can be gravitational as provided by the weight of the assembly itself or in combination with other applied weight, or it can be provided by other means such as a hydraulic cylinder, jack screw, or by manual means.

The shaft 74 includes a reduced diameter end portion 75 which is received in an axial bore formed in the block 72 and is retained by a bolt 92 received in a counterbore formed in the block, with a washer 93 received between the head of the bolt and the bottom of the counterbore.

The sleeve 76 is a cylindrical member with a circular flange 94 formed at its upper end. A plurality of pockets or cylindrical depressions 96 (two of three illustrated herein) are formed circumferentially about the top surface of the flange, and a plurality of corresponding pockets 97 are formed in the bottom surface of block 72. Compression springs 98 are received within the pockets 96 and 97.

Figures 5, 6:
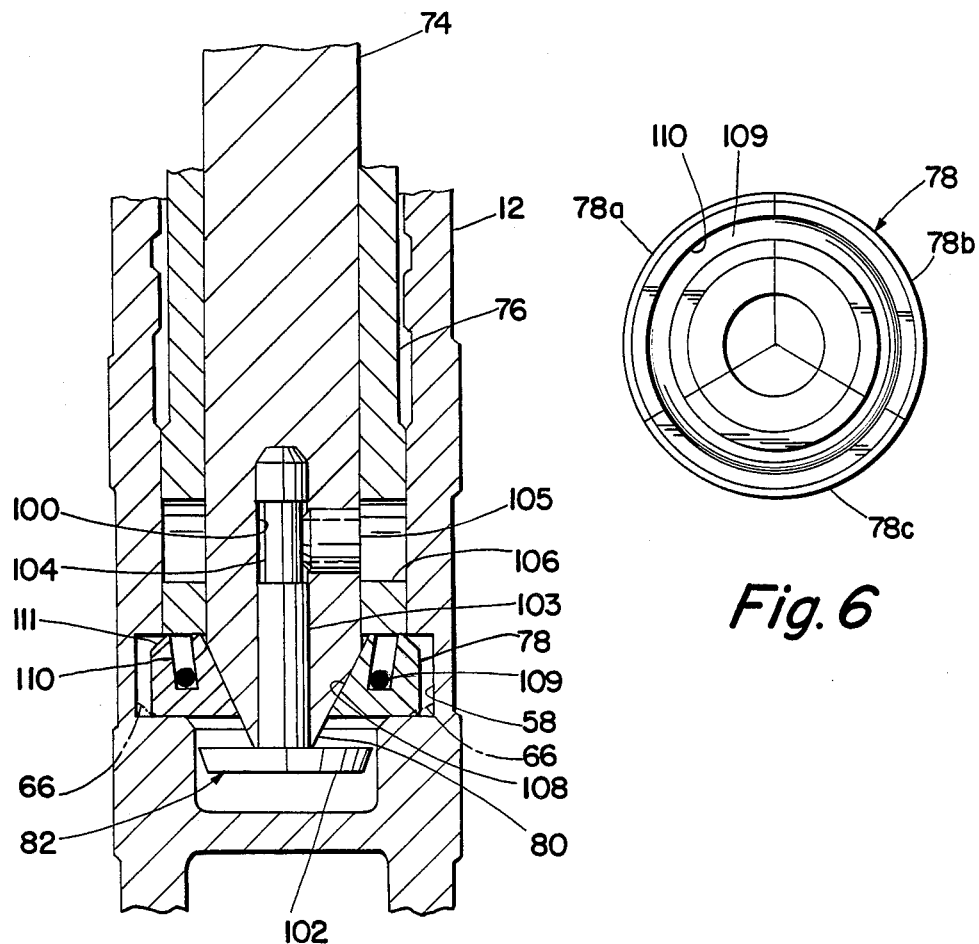
FIG. 5 is an enlarged cross-sectional view of a portion of the gauge assembly illustrating the gauging element of the invention in an operative position.
FIG. 6 is a plan view of the gauging element.

Referring particularly to FIGS. 4-6, the lower end 80 of the shaft 74 is tapered, and a blind bore 100 is formed axially therein to receive the retaining member 82. The retaining member 82 is a generally mushroom-shaped member having a head 102 and a shaft 103, with the shaft being received within the bore 100. An undercut portion 104 is formed on the shaft 103, and a set screw 105 is received in a cross hole formed in the shaft 74 to secure the retaining member within the shaft. To provide access to the set screw a cross hole 106 is formed through the sleeve 76. In FIG. 4 the gauging member 78 is shown inserted into a tappet body 12 and still in its retracted position. In FIG. 5 it is shown in an expanded position, extending into the recess 58.

Referring particularly to FIGS. 5 and 6, the expandable gauging member 78 is a washer-like member formed of three segments 78a, 78b and 78c shown in their assembled and retracted condition in FIG. 6. The inside diameter of the gauge member 78 is formed as a tapered surface 108 corresponding to the tapered end 80 of the shaft 74. The segments are normally maintained in the retracted position by an O-Ring 109 which is received in an annular groove 110 formed in the upper face of the assembled part. While an O-Ring represents a preferred retaining means, other flexible, resilient devices such as an elastic washer or coil spring formed into a ring could be used. Although the configuration illustrated is preferred, the O-Ring or other device can also be received in a circumferential groove formed in the outer diameter of the gauging member. The upper edge of the gauging member 78 is chamfered as shown at 111, with the inner diameter of the chamfer being smaller than the bore 16 when the gauging member is expanded, to faciliate smooth contraction of the gauging member segments when the gauging operation is complete and the assembly is to be retracted from the body.

When the gauge assembly 70 is assembled the sleeve 76 is placed over the shaft, the gauging member 78 is slipped over the tapered end of the shaft 74, and the retaining member 82 is inserted into the hole 100 formed in the end of the shaft and retained in position by means of the set screw 105. The springs 98 are inserted between the block 72 and the flange 94, and the shaft is inserted and retained in the block.

The various parts of the assembly such as the shaft 74, the sleeve 76 and the gauge member 78 are sized in the axial dimension such that when the apparatus is assembled as shown in FIG. 4 the springs, 98 apply a slight preload between the sleeve and the block.

Referring to FIG. 4, in the preferred embodiment the indicator assembly 84 comprises a linear transducer 112, such as a Sangino Model AG1 which is attached to the side of the block 72 by means of a clamp member 114. The transducer is attached in position such that the tip of a sensor element 116 contacts the top of the flange 94.

In FIG. 4, the lifter body 12 is shown in position to be checked, resting on a gauging table 118. Preferably the body is maintained in position for checking by means of a holding fixture 119 attached to the gauging table by means not shown. When the gauge assembly is inserted into the lifter body there is no relative movement between the flange 94 and the block 72 up to and including the point at which the gauging member 78 initially contacts the shoulder 56 at the bottom of the recess 58. The point at which this contact occurs can vary from body to body. Further axial movement of the gauge assembly into the bore causes the shaft 74 to move axially relative to the gauging member 78, the movement of the tapered shaft within the internally tapered gauging member causing the gauging member to expand into the recess 58 as illustrated in FIG. 5. Since the amount of radial outward movement of the gauging member 78 is proportional to the axial movement of the shaft by virtue of the interfitting tapers, the readout of the transducer 112 can be calibrated to provided a direct reading of the radial movement of the gauging member into the recess. Accordingly, a minimum acceptable radial dimension to which the gauge member is expanded, representing an operating condition in which the plunger 22 can bottom against the shoulder without interference, can be established. If the recess is properly formed any diameter reading at that minimum or above indicates an acceptable part, while diameter readings under that minimum are not acceptable as indicating an improperly formed recess (as shown in broken line in FIG. 5).

Although a linear transducer 112 is shown as a preferred readout device, other linear measurement devices such as a mechanical dial indicator mounted on the block 72 could be used. The springs 98 provide sufficient overtravel of the shaft 74 to permit the shaft to move through a fixed axial stroke regardless of the amount of radial movement of the gauging member.

The illustrated embodiment of the gauge assembly requires a relatively low actuating force to accomplish the desired gauging function. As mentioned above, the weight of the unit itself can be sufficient, although in some applications additional weight or the application of an additional external force may be required. The application of gravitational force only is advantageous in that it simplifies the gauging operation and thus can increase the throughput of gauged parts. When the gauging operation is complete, an upward force as indicated by the arrow $F_2$ is applied to effect contraction of the gauging member and removal of the assembly from the body 12.

By the use of this gauge assembly a defectively formed part can be detected and taken out of production prior to further assembly of the lash adjuster; furthermore, the existence of a broken tool can be detected and the tool replaced before many defective parts are machined.

We claim:

1. Apparatus for gauging an inside diameter of a cylindrical tappet body having an axial stepped bore formed therein, comprising in combination with said body an elongated shaft having a tapered portion formed at a free end thereof; a cylindrical, expandable gauging element received over said tapered portion; means for retaining said gauging element on said shaft and permitting axial movement therealong; an engagement surface formed on said gauging element and engageable with a step in said bore; means moving said shaft axially into said bore whereby said engaging surface contacts said step and said gauging element expands over the tapered portion of the shaft upon continued axial movement of said shaft; and means for measuring the extent of said expansion of said gauging element.

2. Apparatus as claimed in claim 1, in which said gauging element comprises a plurality of segments assembled into a cylindrical assembly, and flexible means acting on said cylindrical assembly to bias said assembly into engagement with said shaft.

3. Apparatus as claimed in claim 2, in which said segments are configured to define a tapered central bore in said cylindrical assembly corresponding to the tapered end of said shaft.

4. Apparatus as claimed in claim 2 in which said flexible means comprises an O-ring received in an annular groove formed in said cylindrical assembly.

5. Apparatus as claimed in claim 1 including a cylindrical member received over said shaft and engageable with said expandable element, means operatively acting between said cylindrical member and said shaft biasing said cylindrical member into engagement with said expandable element, and linear measurement means mounted in fixed position relative to said shaft and having a moveable element in engagement with said cylindrical member to measure the amount of axial movement of said shaft relative to said cylindrical member.

6. Apparatus as claimed in claim 5, wherein said linear measurement means comprises a linear transducer.

7. Apparatus as claimed in claim 5, including a mounting block, means attaching said shaft to said mounting block, and means mounting said linear measurement means to said mounting block, said biasing means acting between said mounting block and said cylindrical member.

8. Apparatus as claimed in claim 7, in which said biasing means comprises at least one compression spring received between said mounting block and said cylindrical member.

9. Apparatus for gauging an inside diameter of a cylindrical element comprising an elongated shaft having a tapered portion formed at a free end thereof; means for supporting said shaft for axial movement; a cylindrical, expandable gauging element received over the tapered portion of said shaft; means for retaining said gauging element on said shaft and permitting axial movement therealong; an engagement surface formed on said gauging element adapted to engage a portion of the element being gauged; means imparting axial movement to said shaft, continued movement of said shaft after engagement of said engagement surface with the element being gauged causing said gauging element to expand as the tapered portion of the shaft moves relative thereto; and means for measuring the extent of said expansion of the gauging element.

10. Apparatus as claimed in claim 9, in which said gauging element comprises a plurality of segments assembled into a cylindrical assembly, and flexible means acting on said cylindrical assembly to bias said assembly into engagement with said shaft.

11. Apparatus as claimed in claim 10, in which said segments are configured to define a tapered central bore in said cylindrical assembly corresponding to the tapered end of said shaft.

12. Apparatus as claimed in claim 10 in which said flexible means comprises an O-ring received in an annular groove formed in said cylindrical assembly.

13. Apparatus as claimed in claim 9 including a cylindrical member received over said shaft and engageable with said expandable element, means operatively acting between said cylindrical member and said shaft biasing said cylindrical member into engagement with said expandable element, and linear measurement means mounted in fixed position relative to said shaft and having a moveable element in engagement with said cylindrical member to measure the amount of axial movement of said shaft relative to said cylindrical member.

14. Apparatus as claimed in claim 13, wherein said linear measurement means comprises a linear transducer.

15. Apparatus as claimed in claim 13, including a mounting block, means attaching said shaft to said mounting block, and means mounting said linear measurement means to said mounting block, said biasing means acting between said mounting block and said cylindrical member.

16. Apparatus as claimed in claim 15, in which said biasing means comprises at least one compression spring received between said mounting block and said cylindrical member.

* * * * *